United States Patent [19]

Rafferty et al.

[11] Patent Number: 5,046,758

[45] Date of Patent: Sep. 10, 1991

[54] MULTI-CUTTER SELF-PIERCING COVER ASSEMBLY FOR AIRBAG

[75] Inventors: Scott Rafferty, Dover; Bruce Batchelder, Barrington; Mark Dupuis, Rochester, all of N.H.

[73] Assignee: Davidson Textron Inc., Dover, N.H.

[21] Appl. No.: 611,978

[22] Filed: Nov. 13, 1990

[51] Int. Cl.5 .............................................. B60R 21/16
[52] U.S. Cl. ..................................... 280/732; 280/752
[58] Field of Search ............... 280/728, 730, 731, 732, 280/734, 743, 741, 752

[56] References Cited

U.S. PATENT DOCUMENTS

| | | | |
|---|---|---|---|
| 3,632,136 | 1/1972 | Foltz | 280/732 |
| 3,944,250 | 3/1976 | Wulf | 280/732 |
| 4,097,064 | 6/1978 | Ikawa et al. | 280/732 |
| 4,989,896 | 2/1991 | DiSalvo | 280/732 |

Primary Examiner—Charles A. Marmor
Assistant Examiner—Karin Tyson
Attorney, Agent, or Firm—John C. Evans

[57] ABSTRACT

A cover assembly for an air cushion restraint has a smooth cover with a layer of foam connected between the cover and a load bearing insert for covering a housing for an airbag and a gas generator which generates an inflatant for the airbag for deploying the airbag; three cutters are pivotally connected to the insert member to cut an insert cover member from the insert and to pierce the smooth outer cover member during inflation of the airbag so as to form a self-piercing cover assembly which will be cut to form a three sided opening through the cover assembly through which the airbag is deployed; the cutters are actuated by an insert cover member support system which will operate the cutters as the airbag is inflated to cause cutting edges on the cutters to pierce the smooth outer cover member. The cutters are recessed within the cover assembly to avoid incidental contact with the cutting edges prior to deployment. The cutters are configured such that on deployment the cutting edges have only a limited entry into the passenger compartment of a vehicle. The cutters are arranged to self-retract following airbag deployment to shield the cutting edges from passenger contact during secondary impacts.

15 Claims, 3 Drawing Sheets

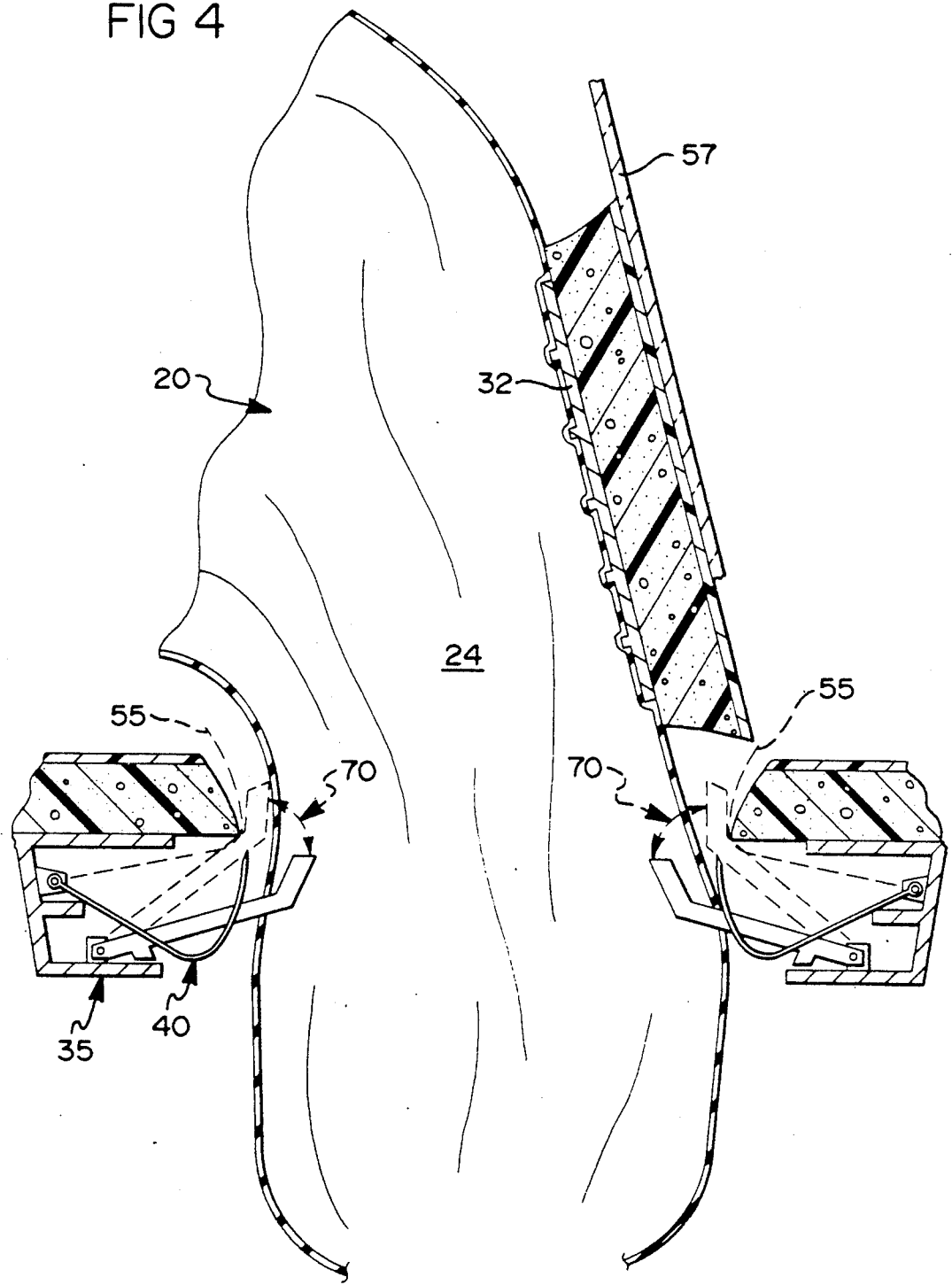

MULTI-CUTTER SELF-PIERCING COVER ASSEMBLY FOR AIRBAG

FIELD OF THE INVENTION

This invention relates to airbag restraint systems for vehicles and more particularly to such airbag restraint systems which are covered by a cover assembly for concealing the airbag restraint system in a vehicle passenger compartment.

BACKGROUND OF THE INVENTION

Various airbag restraint systems are known in which a cover assembly covers the airbag restraint components prior to deployment of an airbag into the vehicle passenger compartment.

U.S. Pat. No. 3,622,176 discloses a cover with a perforated outer skin. The problem with such an arrangement is that the weakened sections are visible and thus do not fully conceal the underlying airbag restraint system. Furthermore, such systems depend upon the force of the inflating airbag to tear the cover to form a deployment opening therein. Such tearing can at times hinder deployment in an undesirable manner.

U.S. Pat. No. 4,097,064 discloses a cover assembly which carries a cutter to pierce the outer skin of the cover assembly. However, the '064 arrangement requires a separate inertially responsive shields for protecting the airbag during its deployment.

U.S. Pat. No. 4,246,213 discloses a cover assembly that includes a cover having weakened sections in the outer shell or skin of a cover assembly. The '213 arrangement depends upon tearing of the outer skin at the weakened sections for airbag deployment and presents the same disadvantages as in the case of the '176 patent.

SUMMARY OF THE INVENTION

The present invention includes an airbag restraint system in which cutters are actuated to cleanly cut the outer skin portion of a cover assembly for the airbag restraint system so as to prevent the outer skin form tearing and creating debris in the passenger car of a vehicle when the airbag is deployed into the passenger compartment of a vehicle to protect passengers when the vehicle is impacted.

A feature of the present invention is to provide a self-piercing cover assembly for an airbag restraint system in which a plurality of cutters are located in a recessed disposition prior to deployment and the plurality of cutters are operative to be self-returned to the recessed position following airbag deployment.

A further feature of the present invention is to provide a self-piercing cover assembly for an airbag restraint system which will form a three sided opening through the cover assembly solely in response inflation of the airbag and impact of the airbag against the inboard surface of the cover assembly wherein the opening is formed by cutters having a recessed position below the cover during normal operation to prevent contact therewith in nondeployment incidents; a cover piercing position in which cutting edges have only a limited entry into the passenger compartment of a vehicle and support structure for the cutters being included so as to permit self-return of the cutters into the recessed position.

Yet another feature of the present invention is to provide self-piercing cover assemblies as set-forth in the preceding summary further characterized by having three cutters located on three side of a cover insert member located in an access hole through the retainer insert of an interior trim assembly and wherein a pivot connection is provided between each of the cutters and the retainer insert and a cover insert support member engages each of the pivoted cutters to hold them in a recessed position with the cover assembly; the insert support member being pivotally connected to the retainer insert so as to control pivotal movement of the cutters on airbag deployment to pierce the outer cover while limiting entry of the cutting edges thereof into the passenger compartment and wherein the cutters are self-returning to their recessed positions following airbag deployment.

Still another feature of the present invention is to provide an interior trim product for a vehicle having a cover assembly for concealing an airbag restraint system within the interior trim product and wherein the cover assembly includes a polymeric outer skin; a foam layer and an retainer insert member for supporting the interior trim product on the frame of a vehicle; the retainer insert member being provided with an opening having an insert cover member supported therein; the retainer insert member pivotally carries three cutters operative solely in response to inflation of the airbag to pierce the outer skin and foam layer around the cover insert member laterally outboard of three sides thereof so as to cause the cutting edge of each of the cutters to pierce the foam and polymeric outer skin to form a clean cut, debris free, three sided opening therein to define an escape passage for deployment of the airbag into the passenger compartment of a vehicle; the cutters are curved between the pivot connection to the retainer insert and the cover insert member to cause the three sided opening to be formed upon only a limited entry of the cutting edges into the passenger compartment and the three cutters are self-returning following formation of the three sided opening into a recessed position within the interior trim product.

Yet another object of the invention is to provide a cover assembly for concealing an airbag restraint system including an airbag, a housing for the airbag, a gas generator located in the housing for supplying gas to the air bag in response to vehicle impact; the cover assembly having an outer cover on the cover assembly fully concealing the air restraint system when the airbag is deflated; three cutters are located inboard of the outer cover each having a cutting edge located in spaced recessed relationship to the inboard surface of the outer cover and laterally spaced outboard of the edges of an insert cover member in the cover assembly; insert cover member support members are engageable with the airbag during its deployment and the insert cover support members are engageable with the cutters to cause them to be operative in response to deployment of the airbag to cleanly cut the outer cover to form an opening therein for deployment of the airbag through the cover assembly to a point outwardly thereof for protecting a vehicle occupant in a vehicle passenger compartment.

These and other objects, advantages and features of the present invention will be more apparent when taken in conjunction with the following detailed description of the invention along with reference to the accompanying drawings wherein:

BRIEF DESCRIPTION OF THE DRAWINGS

FIG. 4 is a view of the cutters following deployment of the airbag.

DETAILED DESCRIPTION OF THE INVENTION

Figure 1:
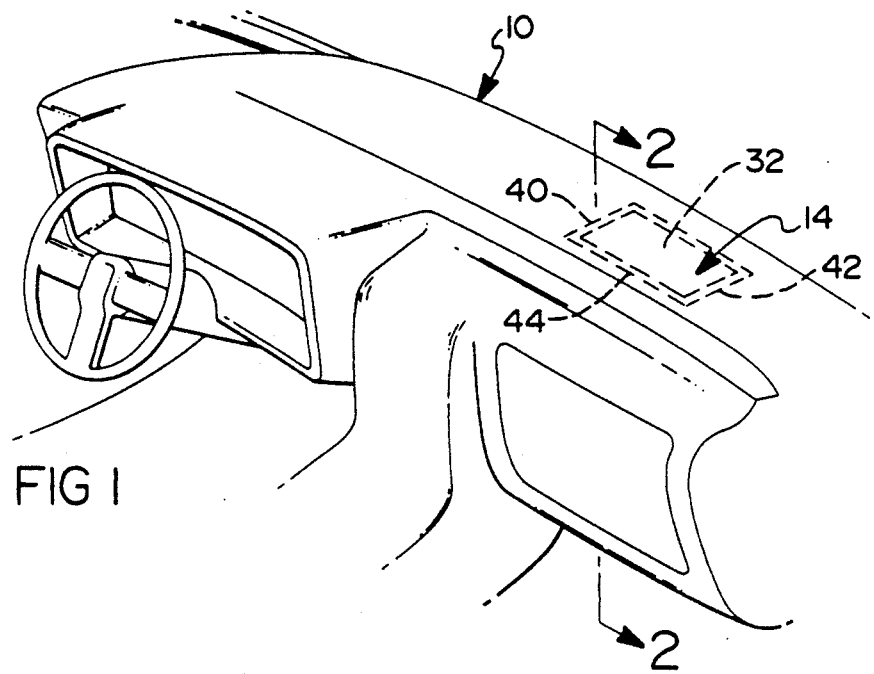
FIG. 1 is a perspective view of an instrument panel assembly including the cover assembly of the present invention.

FIG. 1 shows a instrument panel 10 having a airbag restraint system 12 located behind a cover assembly 14 constructed in accordance with the present invention.

The airbag restraint system 12 includes an airbag housing 16 which encloses a gas generator 18 for supplying an inflatant to an airbag 20 shown in a collapsed position within the housing 16. The airbag 20 includes an inboard end 22 defining a passage 22a for flow of the inflatant from the gas generator 18 into the interior 24 of the airbag 22. The airbag 20 also includes an outboard end 26 which is engageable with the inboard surface 28 of a cutter unit 30.

The cutter unit 30 includes a cover insert member insert 32 defining the inboard surface 28. The cover insert member 32 has a shape corresponding to the shape of an opening 34 formed in a retainer insert member 35 which is secured by suitable fasteners in a known manner to the vehicle frame so as to fix the instrument panel 10 in place within the passenger compartment of the vehicle. The cover insert member 32 has an outboard surface 32a bonded to a layer of urethane foam 36 formed in underlying relationship to a polymeric skin or shell 38 forming the outer surface of the instrument panel 10.

The cover insert member 32 is shown in hidden line in FIG. 1 as having a rectangular shape.

Figure 2:
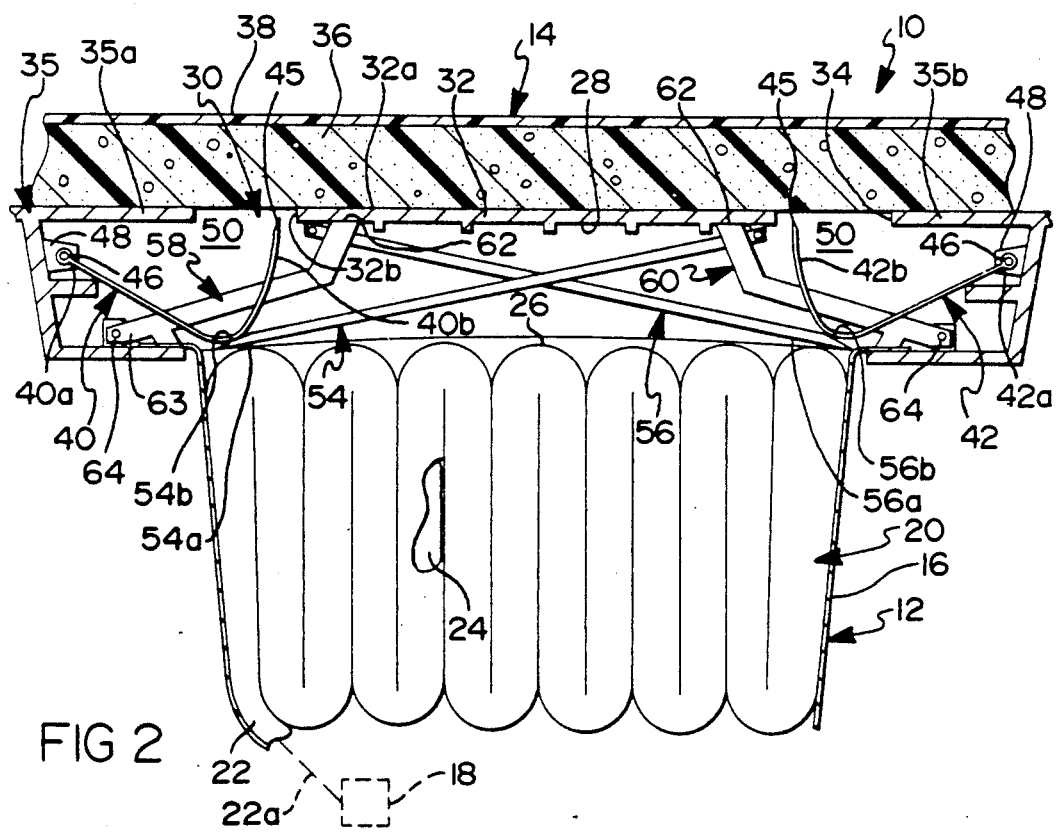
FIG. 2 is a fragmentary sectional view taken along the line 2—2 of FIG. 1 looking in the direction of the arrows.

In accordance with one aspect of the present invention, three separate cutters 40, 42, 44 are recessed within the instrument panel 10 below the outer skin or shell 38 thereof by a distance such that incidental contact with the outer surface of the instrument panel will not cause the cutting edge 45 to be exposed in an undesirable manner. Two of the cutters 40,42 are shown in FIG. 2 with it being understood that a like cutter 44 is located at the front edge of the cover insert member 32 as shown in broken outline in FIG. 1. The connection of the cutter 44 to the retainer insert member 35 will be the same as well be described below with respect to the cutter 40, 42.

Each of the cutting edges 45 are further shielded in their normal recessed position by side portions 35a and 35b of the retainer insert 35 and side edges 32b of the cover insert member 32.

Each of the cutters 40, 42, 44 have an outboard end 40a, 42a, 44a which is pivotally connected by a pin 46 to a support tab 48 on the retainer insert 35. The opposite end 40b, 42b, 44b of each of the cutter 40, 42, 44 have a sharp cutting edge 45 which is aligned with an opening 50 formed around three sides of the cover insert member 32. Each cutter 40, 42, 44 is bent through approximately a right angle curve so that the sharp edges 45 are aligned with the opening 50 at a point laterally outboard of the cover insert member 32.

The cover insert member 32 is pivotally connected to a plurality of arms each of which engage the underside of one of the cutters 40, 42, 44. Two of the arms are shown in FIG. 2 as scissored actuator arms 54, 56 each having an underside 54a, 56a respectively which engages the airbag 20 as it is deployed. Each of the actuator arms 54, 56 also include a upper surface 54b, 56b which engages the underside of the cutters 40, 44 respectively.

In accordance with another principle of the present invention the cover insert member 32 is held in its normal, pre-deployment position by cover insert member support arms two of which are shown at 58, 60 in FIG. 2. Each of the support arms includes a cover support surface 62 on one end and a pivoted end 63 on its opposite end which is pivoted to the retainer insert 35 by a pivot pin 64 at a point offset inboard of the pivot connection of the cutters 40-44 for reasons to be discussed.

In operation, when the airbag 20 inflates in response to an impact sensed by an inertial sensor (not shown) which triggers generation of inflatant from the generator 18, the blades 40, 42, 44 are engaged by the actuator arms 54, 56 to be swung upwardly. The sharp edges 45 initially cut through the foam layer 56 and then continue to cut upwardly through the outer skin or shell 38 to form a three sided opening through which the airbag 20 is deployed into the passenger compartment. The sharp edges 45 completely cut the outer shell 38 before the airbag opens the cover insert member 32 by forcing it through the resultant door opening formed by the three cut sides in the shell member 38 around and above the cover insert member 32.

While the cover assembly 14 is shown as having a urethane foam layer 36 with an outer shell 38 it should be understood that the outer skin 38 can be formed as a more dense outer surface on the foam layer 36. Further while an instrument panel 10 is illustrated with a retainer member, the invention is equally suitable for use with other interior trim products such as consoles and steering wheel covers. Further, the cover compositions and arrangements can have a different polymer composition than urethane foam. Further, the retainer member may be omitted and the cutter unit can be supported by other structure for piercing the cover assembly 14 solely in response to inflation of an airbag in an airbag restraint system.

A feature of the present invention is that the three cutters 40, 42, 44 are configured such that the cutting edges 45 thereof will only penetrate a limited distance into the passenger compartment when the airbag is deployed. The limited entry is shown in broken outline at the location marked by reference numeral 55 in FIG. 4.

A further feature of the present invention is that the cutters 40, 42, 44 are self-returning to their normal recessed position within the instrument panel 12 once the airbag has been employed thereby to avoid any contact with the cutters 40, 42, 44 if the impacted and airbag deployed vehicle is subjected to secondary impacts.

The self-return feature is attributable to the manner in which the cover insert member 32 is separated from the cover assembly 14. As shown in FIG. 4. The cover assembly 14 will be cut such that the cover insert member 32 will be separated on three edges from the foam layer 36 and the outer skin or shell 38. The actuator arms 54 and 56 are lifted outwardly of the instrument panel in the direction of the vehicle windshield 57 along with the cover insert member 32. The cover support members 58, 60 remain pivotally attached to the insert member 35 by pivot pins 64. The support surfaces 62 of the cover insert member support arms 58, 60 only serve as a rest stop for the insert cover member 32 prior to deployment of the airbag. Once the airbag is deployed the cutters or blades 40, 42, 44 first cut the foam layer 36 and the outer shell 38. Then the cover insert member 32 will be raised by the arms 58, 60 as they pivot upwardly on initial deployment of the airbag 20. Eventually the airbag 20 lifts the cover insert member 32 away from the support arms 58, 60 to cause separation at the upper surfaces 62 thereon.

The actuator arms 54, 56 are operated before the cover support arms 58, 60 swing the cover 32 into the open position so that the outer skin or shell 38 is completely severed on three sides so as to prevent tearing and production of resultant debris as the cover insert member 32 is raised.

Figure 3:
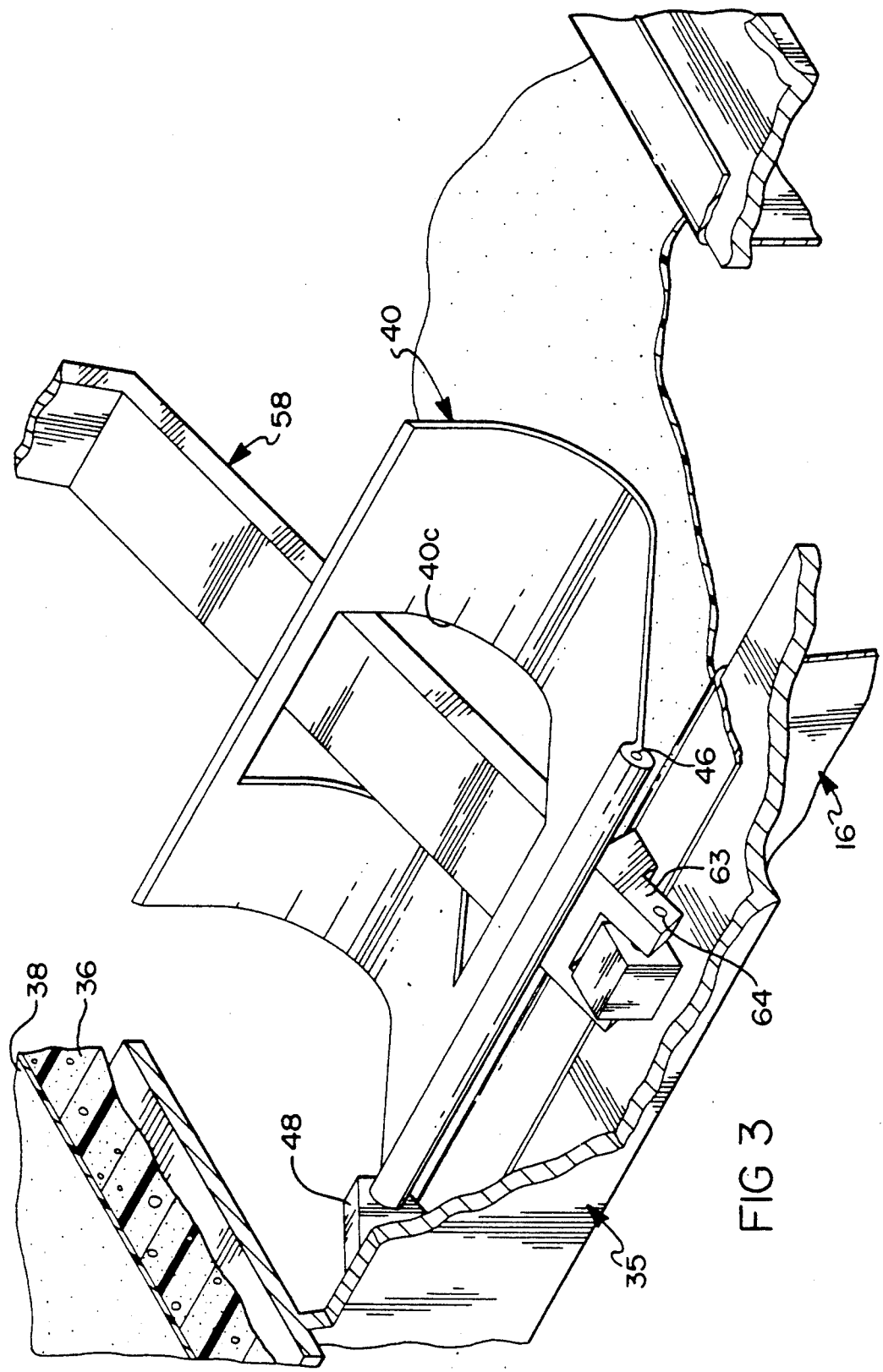
FIG. 3 is a fragmentary enlarged perspective view of the present invention.

Once the airbag is deployed as shown in FIG. 4, the support arms 58, 60 and the cutters 40, 42 will fall back into their recessed position as shown at 70 in FIG. 4 so as to be protected against passenger contact in the event of secondary impacts. The support arms 58, 60 are directed through center holes in the cutters 40, 42, 44 such as shown at 40c in FIG. 3 so as to allow for relative pivotal movement therebetween to provide the necessary lost motion to achieve the full cutting of the outer shell before the cover insert member 32 is actuated.

Examples of suitable foam materials include low modulus elastomers such as reaction injection molded urethane material having a flexural modulus in the range of 20-80,000 psi at 75 degrees F. or comparable urea or microcellular urethane foam material.

Examples of suitable shell materials include polyvinyl chloride or other thermoplastic materials such as thermoplastic elastomers or thermoplastic olefins.

While exemplary materials for the cover assembly are disclosed herewith it should be understood that the invention is applicable for use with a wide range of other materials including fabrics (both natural and synthetic) leather and other backing materials than the illustrated foam layers (which in certain cover assemblies can be omitted in the entirety).

The foregoing is a complete description of a preferred embodiment of the present invention. It should be understood, however, that various changes and modifications may be made without departing from the spirit and scope of the present invention as set-forth in the following claims.

What is claimed is:

1. A cover assembly for concealing an airbag restraint system including an airbag, a housing for the airbag, a gas generator located in the housing for supplying gas to the air bag in response to vehicle impact the cover assembly comprising:
    an outer shell, a backing layer of foam on said shell and a retainer insert member for securing the cover assembly on a support;
    a cover insert member inboard of said foam layer having side edges thereon forming an an opening with respect to said retainer insert member;
    multiple cutter means pivotally connected to said retainer insert member at a recessed position inboard of said outer shell; said multiple cutter means each including a sharp cutting edge located adjacent one of said side edges prior to deployment of said airbag;
    actuator means responsive to deployment of said airbag to cause said multiple cutter means to pivot with respect to said retainer insert member to cause said sharp cutting edges to sequentially cut through said foam layer and said outer shell at said opening between said insert cover member and said retainer insert member for forming a three sided opening in said outer shell before said cover insert member is displaced and said cover insert member thereafter being engaged by said airbag during its deployment to open so as to define a passage for deployment of said airbag into a vehicle passenger compartment.

2. The cover assembly of claim 1 further characterized by having an insert cover support system including insert cover member support arms for supporting said insert cover member with respect to said outer shell prior to deployment of said airbag.

3. The cover assembly of claim 2 further characterized by said actuator means including actuator arms having an end portion pivotally connected to said insert cover member and separable with said insert cover member when said airbag is fully deployed.

4. The cover assembly of claim 1 further characterized by said multiple cutter means including three separate cutters; each of said cutters having a first end pivotally connected to said retainer insert member and each of said cutters having a second end bent substantially at a right angle to said first end and having said sharp cutting edge positioned at a point located below said opening prior to airbag deployment;
    said actuator means pivoting said three separate cutters in a direction to cause said sharp cutting edges thereof to form a three sided opening in said outer shell and to form a pivot connection between said insert cover member and said outer shell for swinging said insert cover member upwardly in the direction of a front windshield of a vehicle; and
    said actuator means including means to allow said cutters to fall from their cutting positions back to their recessed positions following deployment of said airbag.

5. The cover assembly of claim 4 further characterized by having an insert cover support system including cover support arms for retaining said cover insert member with respect to s id outer shell prior to deployment of said airbag.

6. The cover assembly of claim 4 further characterized by said actuator means including actuator arms having an end portion pivotally connected to said insert cover member and separable with said insert cover member when said airbag is fully deployed.

7. An interior trim member having an invisible door for concealing an airbag restraint system including a airbag, an airbag housing, a gas generator and a retaining member for supporting the interior trim member on a vehicle frame characterized by:
    the interior trim member having an outer skin with a smooth outer surface, a foam backing layer and an retainer insert member bonded together as a composite assembly;
    a cover insert member located inboard of said foam layer having side edges thereon forming an an opening with respect to said retainer insert member;
    multiple cutter means pivotally connected to said retainer insert member at a point recessed below said outer shell; said multiple cutter means each including a sharp cutting edge located adjacent one of said side edges prior to deployment of said airbag;

means responsive to deployment of said airbag to cause said multiple cutter means to pivot with respect to said retainer insert member to cause said sharp cutting edges to sequentially cut through said foam layer and said outer shell at said opening between said insert cover member and said retainer insert member for forming a three sided opening in said outer shell defining a passage for deployment of said airbag into a vehicle passenger compartment.

8. The cover assembly of claim 7 further characterized by having an insert cover support system including cover support arms for retaining said cover insert member with respect to said outer shell prior to deployment of said airbag.

9. The cover assembly of claim 7 further characterized by said actuator means including actuator arms having an end portion pivotally connected to said insert cover member and separable with said insert cover member when said airbag is fully deployed.

10. The cover assembly of claim 1 further characterized by said multiple cutter including a blade pivotally connected to said retainer insert member at a first surface thereon; an actuator arm pivotally connected to said cover insert member and having an outboard surface thereon engaging said blade to pivot said blade in a direction to cause said sharp cutting edge thereof to cut said outer skin before said cover is moved by said airbag during its deployment.

11. The cover assembly of claim 10 further characterized by a cover insert member support arm pivotally connected to said retainer insert member at a second surface thereon; said blade having a central opening therein and said cover insert member support arm extending through said opening to permit movement of said blade to cut said outer shell prior to opening movement of said cover insert member during deployment of said airbag.

12. The cover assembly of claim 11 further characterized by said cover support arm having a ledge surface supporting said cover insert member for separation from said cover support arm as said cover insert member opens and said cover support arm being initially raised by airbag deployment but falling following opening of said cover insert member to allow for self-return of said blade into its recessed position.

13. The cover assembly of claim 7 further characterized by said multiple cutter including a blade pivotally connected to said retainer insert member at a first surface thereon; an actuator arm pivotally connected to said cover insert member and having an outboard surface thereon engaging said blade to pivot said blade in a direction to cause said sharp cutting edge thereof to cut said outer skin before said cover insert member is moved by said airbag during its deployment.

14. The cover assembly of claim 13 further characterized by a cover insert member support arm pivotally connected to said retainer insert member at a second surface thereon; said blade having a central opening therein and said cover insert member support arm extending through said opening to permit movement of said blade to cut said outer shell prior to opening movement of said cover insert member during deployment of said airbag.

15. The cover assembly of claim 13 further characterized by said cover support arm having a ledge surface supporting said cover insert member for separation from said cover support arm as said cover insert member opens and said cover support arm being initially raised by airbag deployment but falling following opening of said cover insert member to allow for self-return of said blade into its recessed position

* * * * *